April 16, 1935.　　　J. OLASZY　　　1,997,945
AIR TERMINAL DEVICE
Filed April 21, 1933　　8 Sheets-Sheet 3
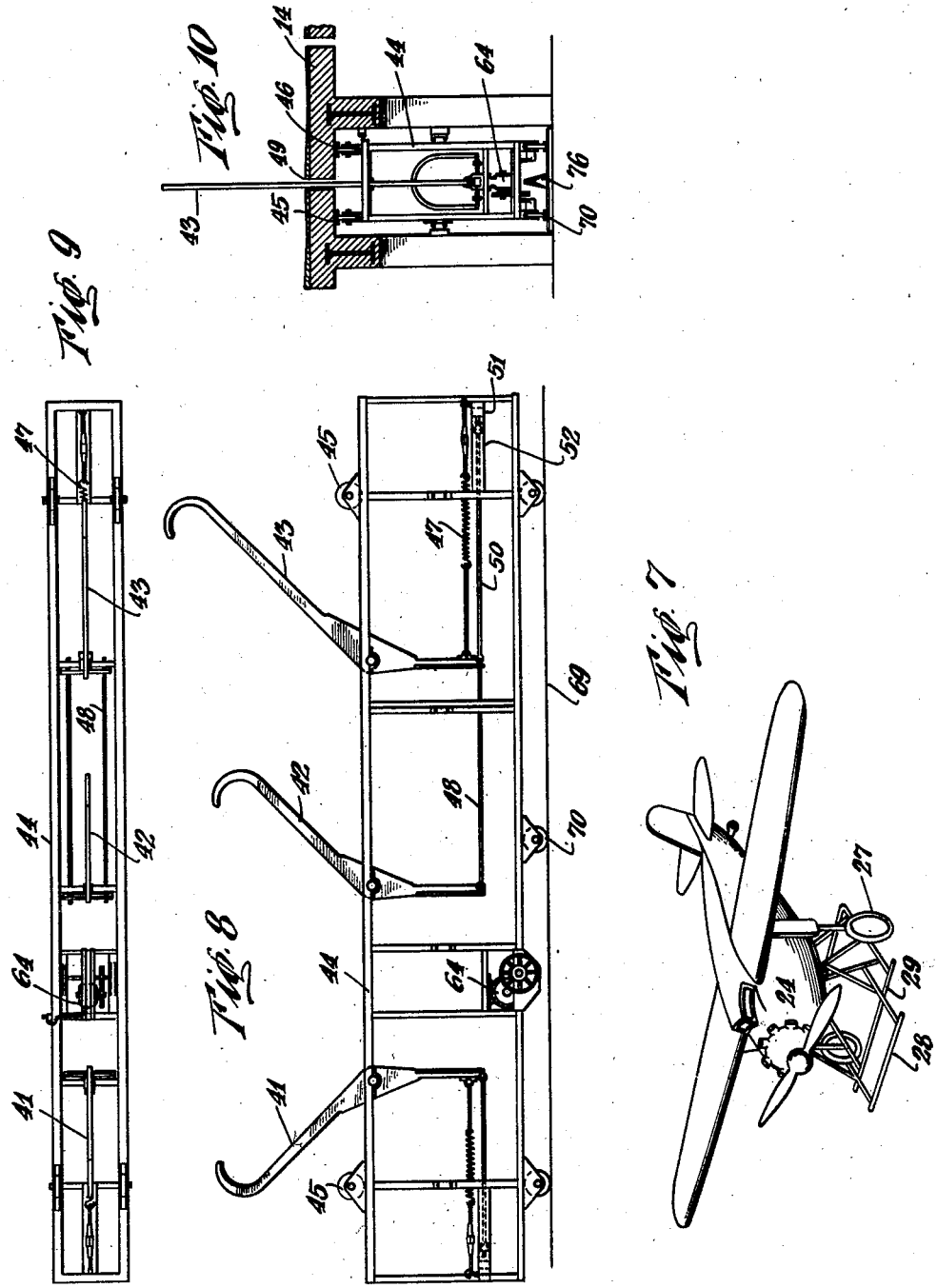
INVENTORS
JOSEPH OLASZY
BY
ATTORNEY April 16, 1935. J. OLASZY 1,997,945
AIR TERMINAL DEVICE
Filed April 21, 1933 8 Sheets-Sheet 4
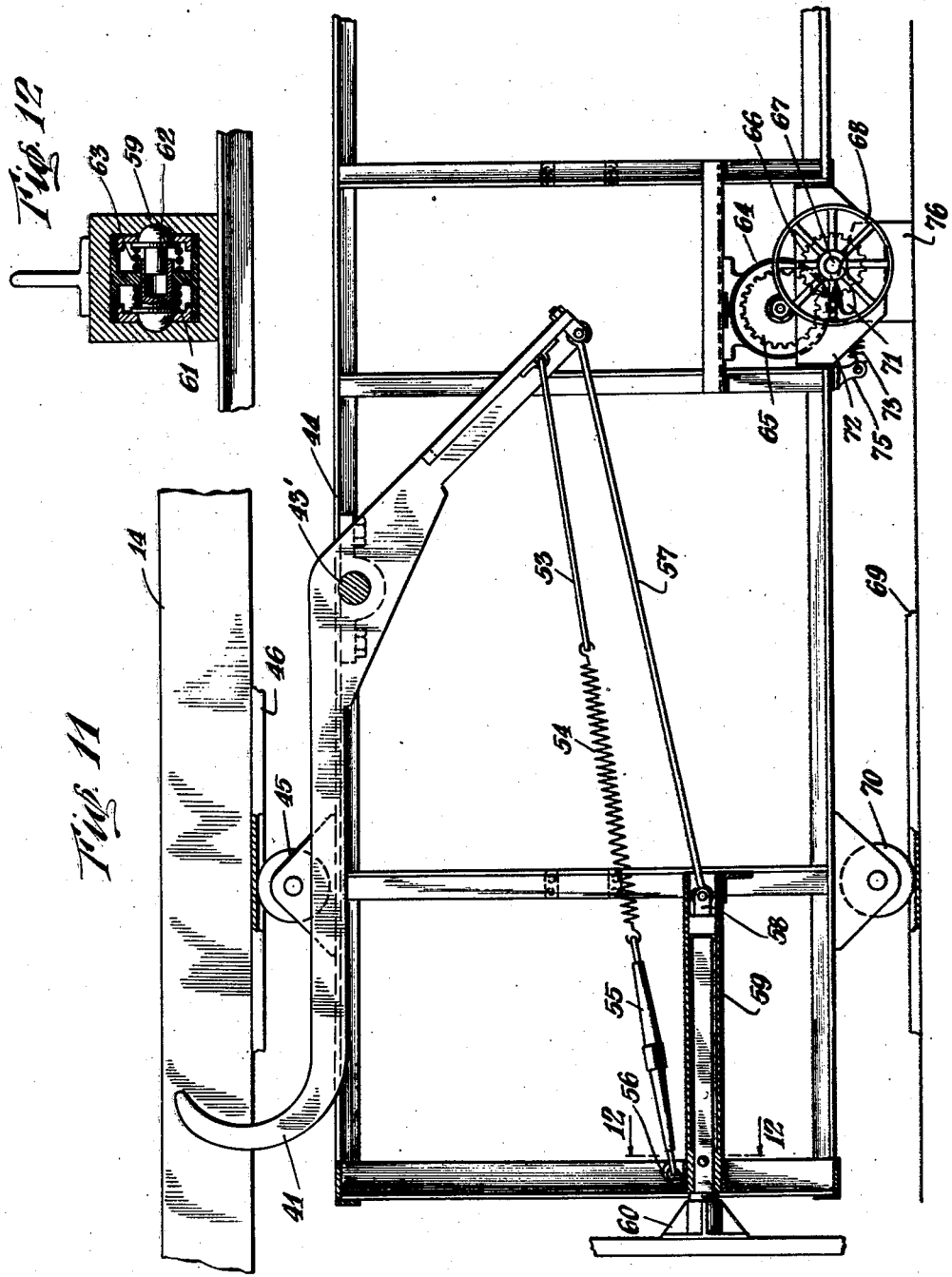
INVENTORS
JOSEPH OLASZY
BY.
ATTORNEY

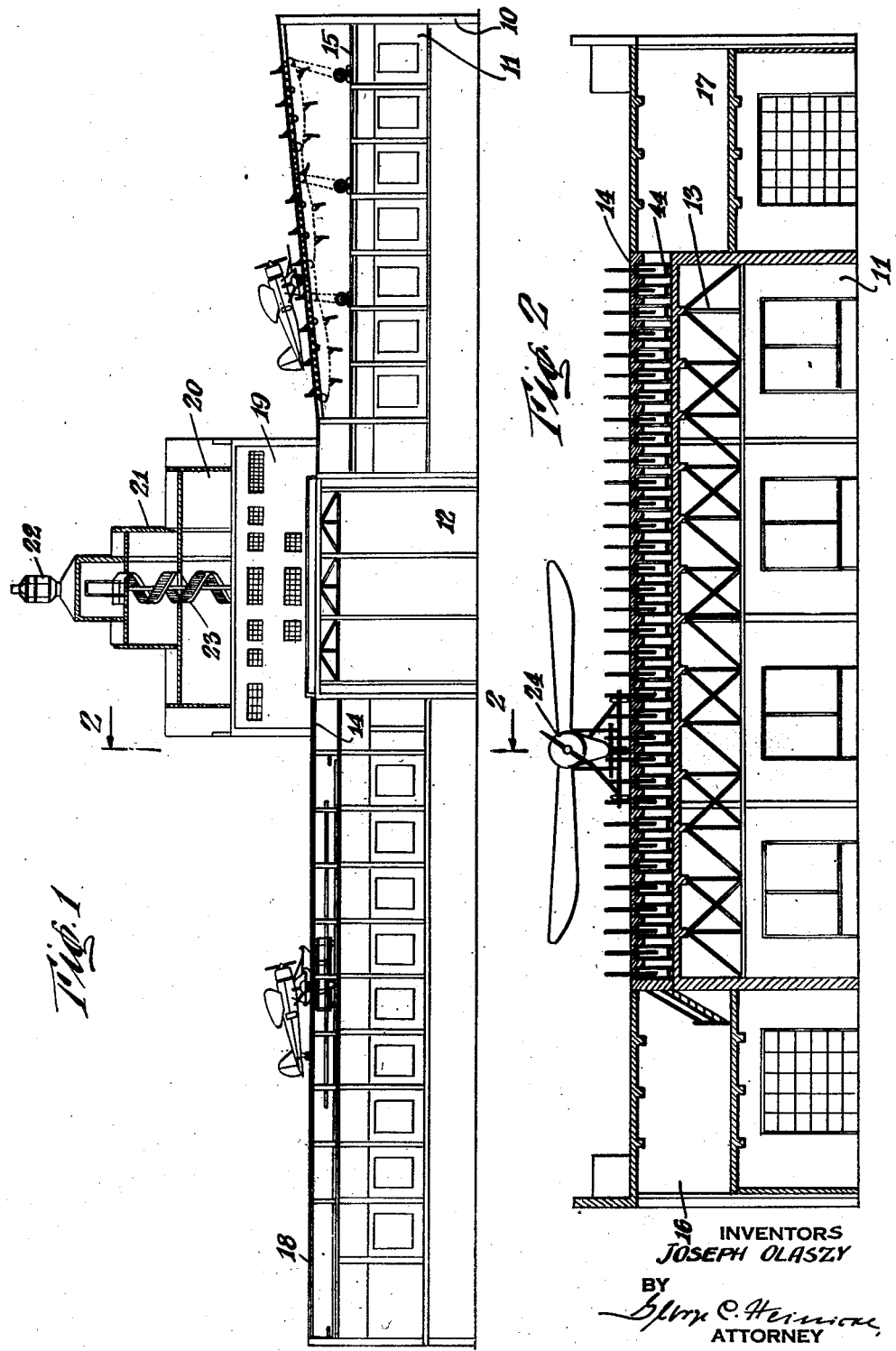

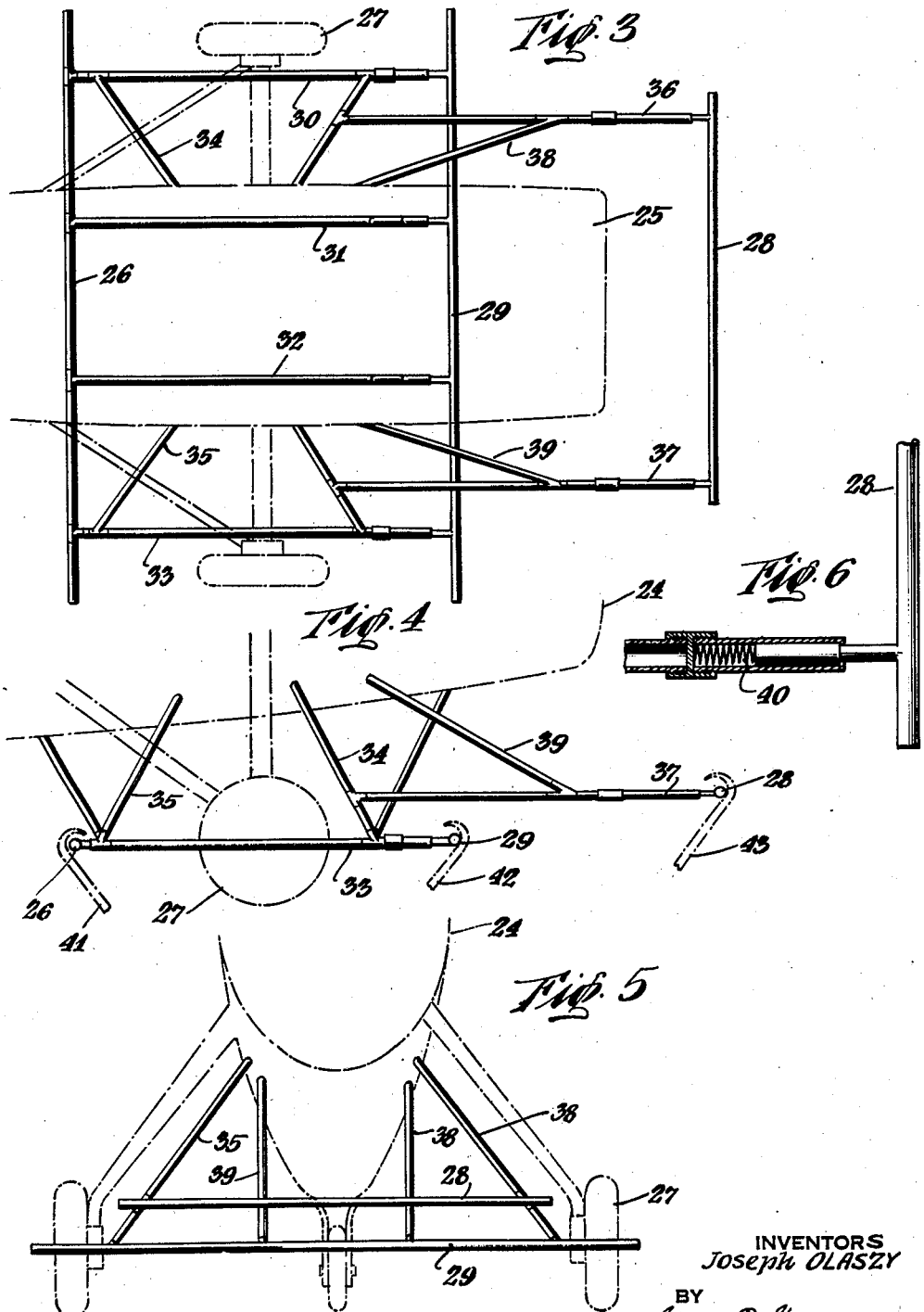

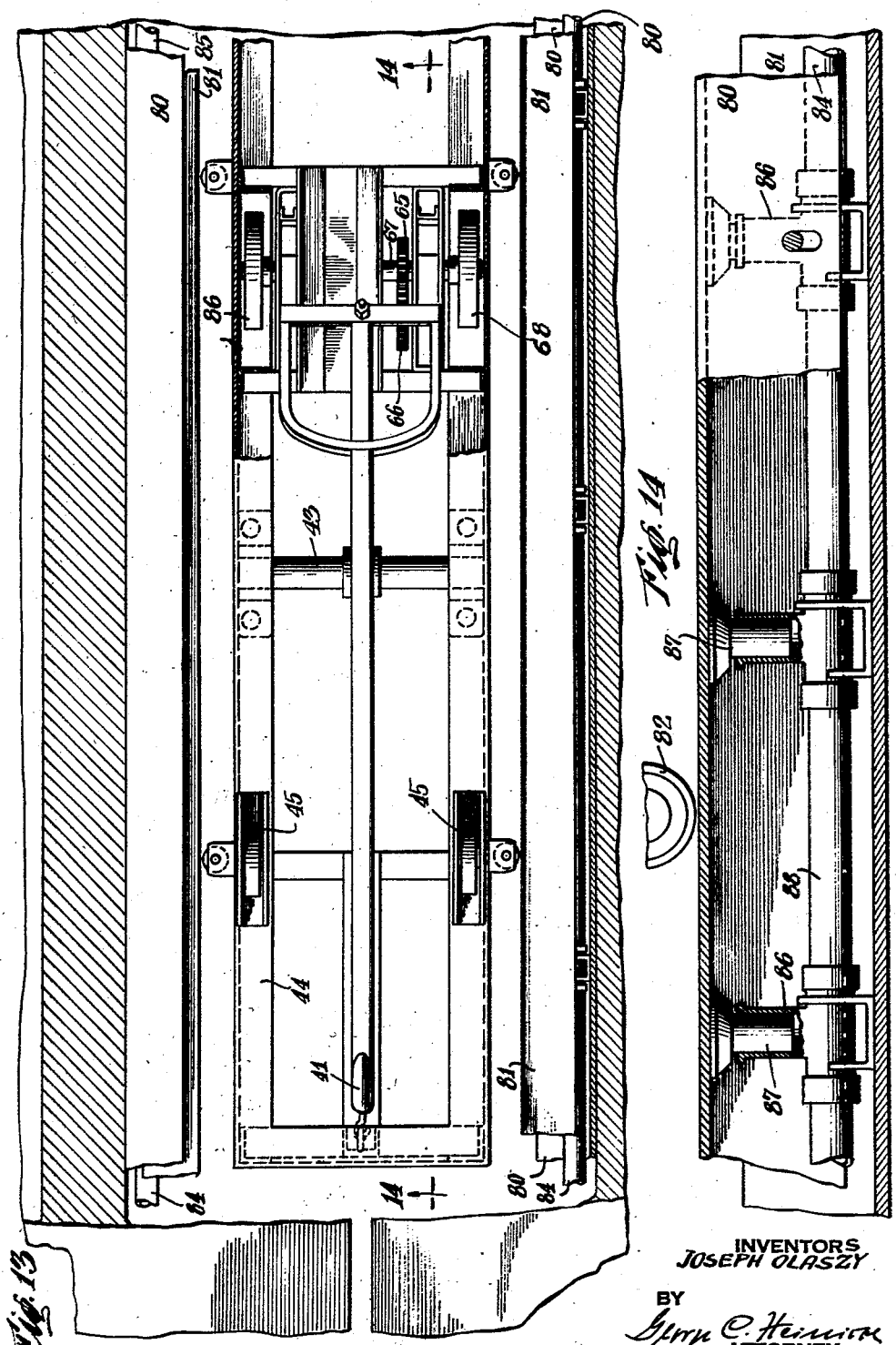

April 16, 1935.                J. OLASZY                1,997,945
                           AIR TERMINAL DEVICE
                      Filed April 21, 1933         8 Sheets-Sheet 6
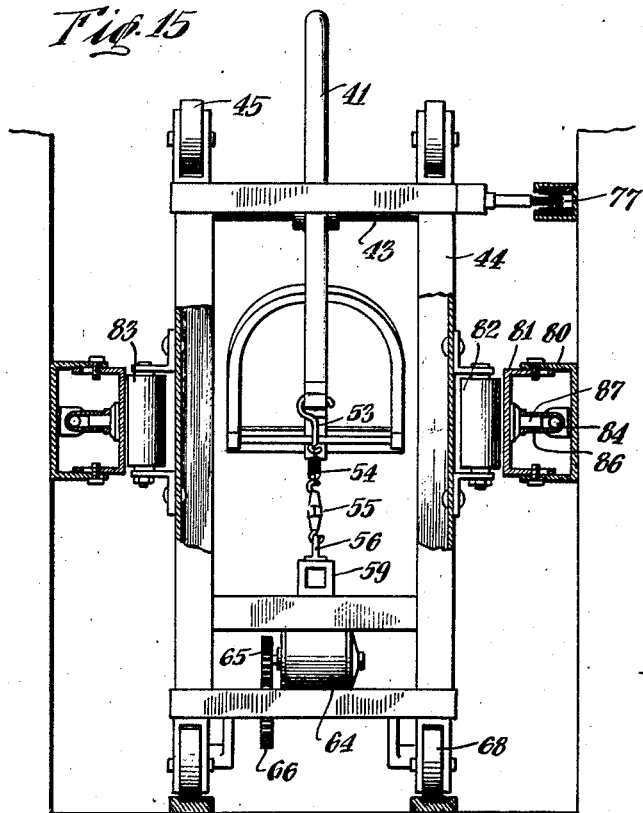
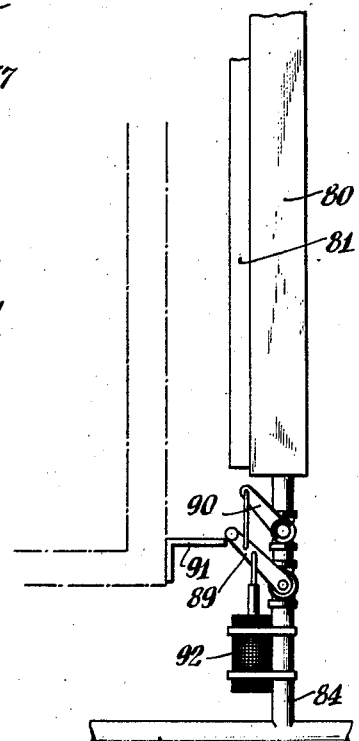
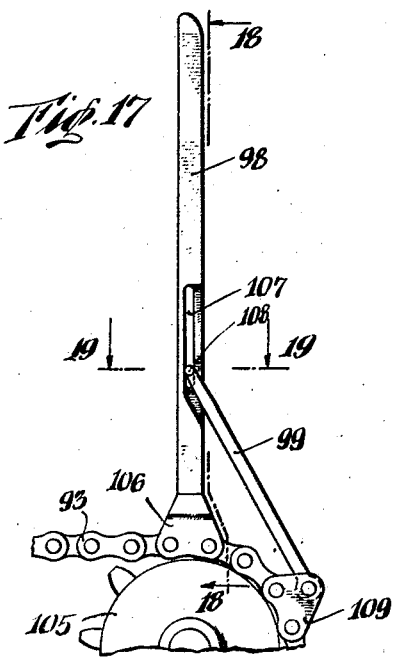
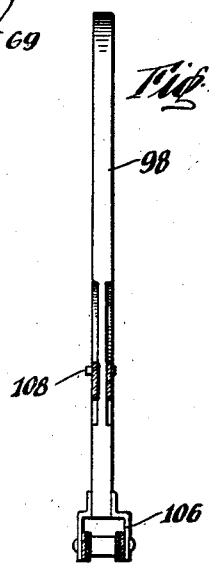
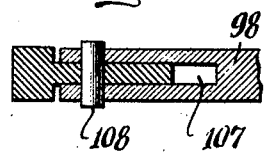
INVENTORS
JOSEPH OLASZY
BY
ATTORNEY April 16, 1935. J. OLASZY 1,997,945
AIR TERMINAL DEVICE
Filed April 21, 1933 8 Sheets-Sheet 7
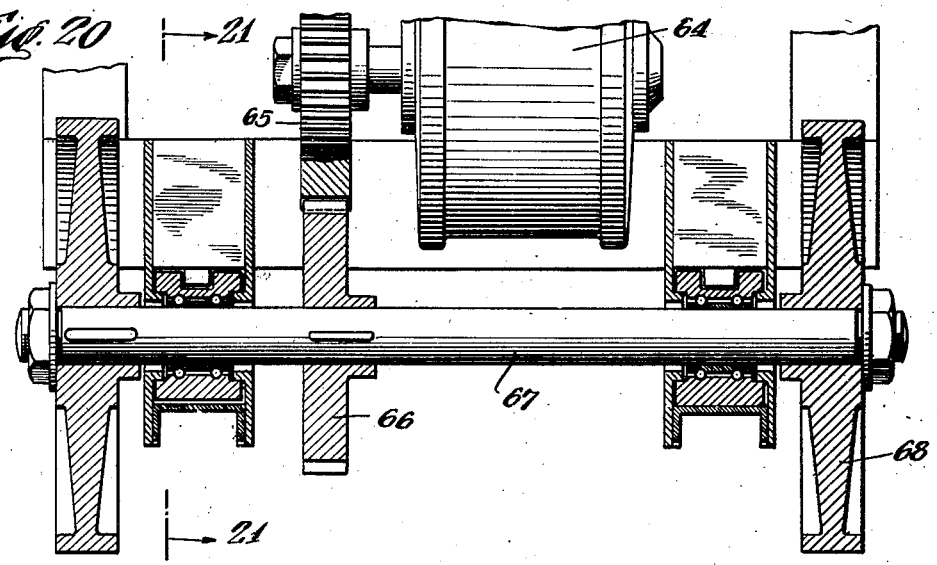
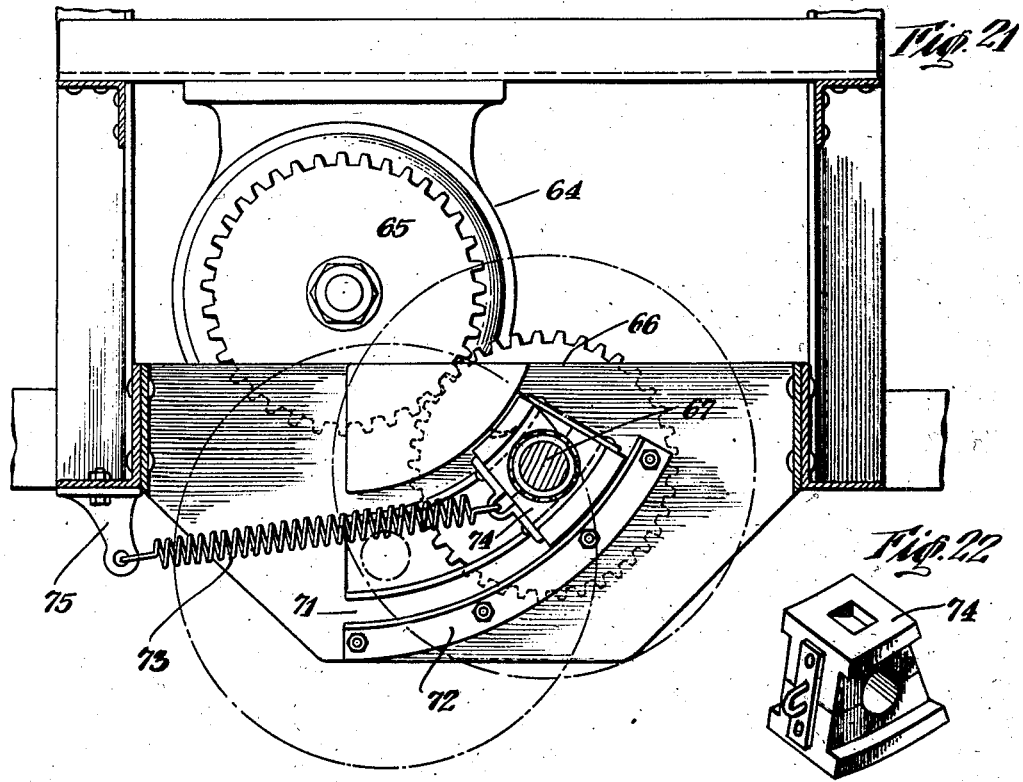
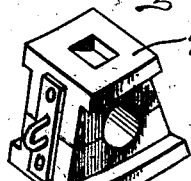
INVENTOR
Joseph OLASZY
BY
ATTORNEY April 16, 1935.  J. OLASZY  1,997,945
AIR TERMINAL DEVICE
Filed April 21, 1933   8 Sheets-Sheet 8
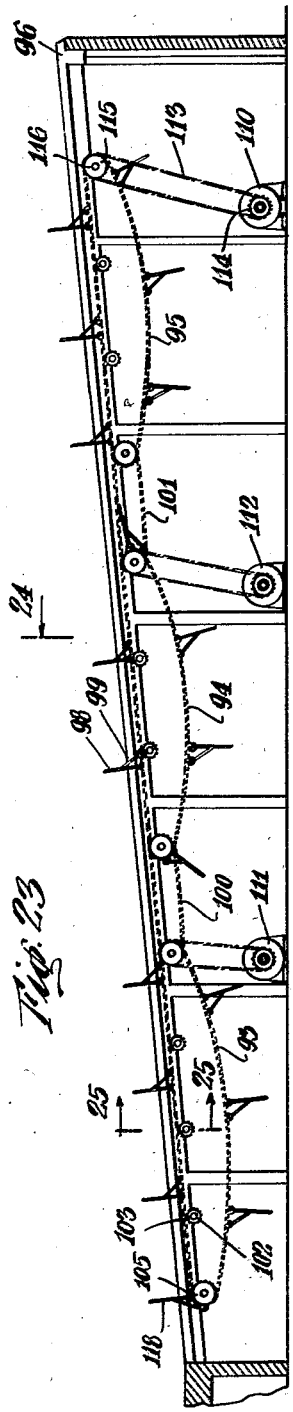
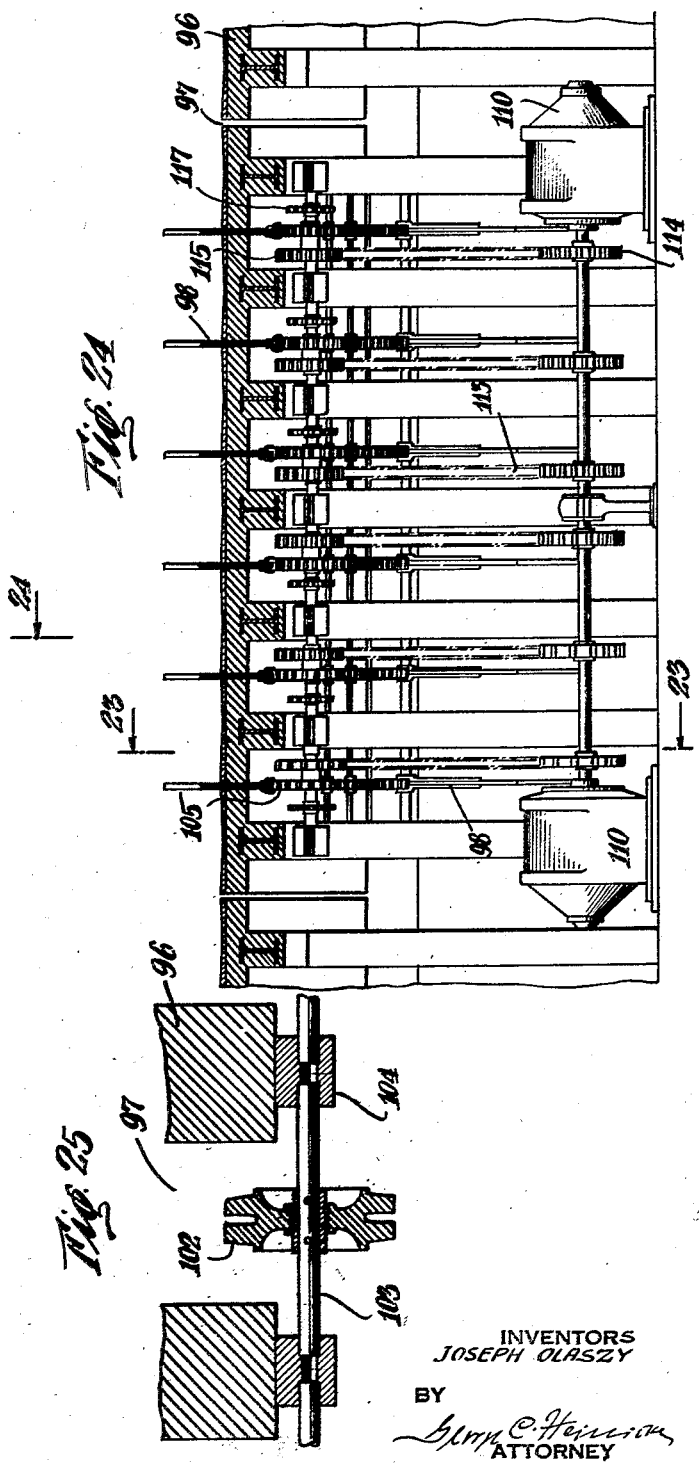
INVENTORS
JOSEPH OLASZY
BY
ATTORNEY Patented Apr. 16, 1935

1,997,945

UNITED STATES PATENT OFFICE 1,997,945

AIR TERMINAL DEVICE

Joseph Olaszy, Linden, N. J., assignor of one-third to Anton Stefancsik, Brooklyn, N. Y.

Application April 21, 1933, Serial No. 667,932

7 Claims. (Cl. 244—2)

This invention relates to an improved airplane landing and starting station, particularly an airplane terminal device which may be installed in large city buildings, on ships, such as airplane carriers, on floating platforms in mid-ocean, or on flying fields, in short everywhere where suitable grounds are found and necessity requires the erection of elevated platforms, as for instance if it is necessary for airplanes to avoid obstructions during landing and starting or taking off.

If the invention is to be used as a terminal device in large cities, it may be installed in the upper floor of tall buildings, while the lower floors of these buildings may be used for offices or other purposes.

It is the principal object of my invention to provide an airplane terminal accommodating a plurality of airplanes at one time by providing a runway on a slotted platform at the inner end of which the airplanes, which are equipped with suitable shock absorbing bumper frames, are engaged and caught by catchers and held on suitable carriages traveling on tracks in suitable lanes, and equipped with a hydraulically operated brake system, while bumpers on the planes protect the landed airplanes against damage.

Another object of my invention is the provision of such carriages equipped with a reversible motor controlled and operated from a common centrally located control room.

Still another object of my invention is the provision of suitable operating and releasing means for the hooks engaging the bumper frame of the airplane landing gear and a compressed air system for operating the hydraulic brake mechanism, controlled by means of a quick opening gate valve operated by the passing carriage.

A further object of my invention is the provision of an airplane terminal device equipped with a suitable take-off equipment comprising a series of motor driven chain conveyers on a slotted inclined platform and provided with means to synchronize the speeds of the chains, while catapult levers contact with the bumper frames of the airplane and will catapult the plane off the platform under the action of the motor driven chains, whereby means are provided to hold the planes while the propellers are warming up.

A still further object of my invention is the provision of an airplane terminal device equipped with a signal system indicating the positions of the carriages by a green light if a landing can be made on the same, and displaying a red light indicating that one or the other of the carriages is occupied by a landing plane.

Red lights on the take off platforms will indicate to the pilot that no landing is to be made on this end of the device.

Further objects of my invention are the provisions of a control room panel board on which the position of the carriages are made visible by suitable lights and switch controls beneath said lights for the operation of each individual carriage and motor, buffer and brake control are provided.

These and other objects of my invention will become more fully known as the description thereof proceeds and will then be specifically defined in the appended claims.

In the accompanying drawings forming a material part of this disclosure:

Fig. 1 is a front elevation of air terminal device constructed according to my invention.

Fig. 2 is a sectional end elevation seen in the direction of arrows 2—2 of Figure 1.

Fig. 3 is a top plan view of the airplane equipment frame.

Fig. 4 is a side elevation thereof.

Fig. 5 is a front view thereof.

Fig. 6 is a detail view of the front bumper connections.

Fig. 7 is a perspective view of an airplane and its landing frame.

Fig. 8 is a side elevation of a landing carriage.

Fig. 9 is a top plan view thereof.

Fig. 10 is an end elevation of the carriage.

Fig. 11 is a fragmentary side elevation of the carriage on a large scale.

Fig. 12 is a detail view of the carriage buffer arrangement on a somewhat enlarged scale and seen in the direction of arrows 12—12 of Figure 11.

Fig. 13 is a top plan view of a carriage brake equipment.

Fig. 14 is a longitudinal section through the same on line 14—14 of Figure 13.

Fig. 15 is a view similar to Figure 10 of the brakes and carriage on an enlarged scale.

Fig. 16 illustrates a valve arrangement.

Fig. 17 is a fragmentary detail side elevation of a drive sprocket and its catapult lever.

Fig. 18 is an end view thereof seen on line 18—18 of Figure 17.

Fig. 19 is a cross-section on line 19—19 of Figure 17.

Fig. 20 is a sectional end elevation of the carriage drive equipment on an enlarged scale.

Fig. 21 is a section on line 21—21 of Figure 20.

Fig. 22 is a perspective detail view of a drive axle bearing block.

Fig. 23 is a longitudinal sectional view through the take-off equipment, the section being taken on line 23—23 of Figure 24.

Fig. 24 is a section on line 24—24 of Figure 23.

Fig. 25 is a section on line 25—25 of Figure 23.

As illustrated in Figures 1 and 2, a building 10 of any suitable size and construction having its lower floors suited for office or the like purposes has one of its upper floors 11 equipped to serve as airplane storage floor to which lead elevators in shafts 12.

The floor 11 carries a steel beam construction 13 carrying the landing platform 14 for the airplanes and the take-off platform 15 for the same, to the sides of which the equipment lofts 16, 17 are arranged, while a runway 18 leads to the landing platform 14.

The building has also above the landing and take-off platforms a mezzanine floor 19, a tank floor or tower base 20 and a tower 21 carrying a beacon 22, while a spiral or winding staircase 23 leads to tank room tower and beacon.

An airplane, generally designated 24 is shown in the process of landing on platform 14 after having had its final run off on runway 18.

The invention comprises three separate equipment units namely, A. The airplane landing gear equipment and B. The landing stage equipment and C. The take-off equipment.

A. The airplane landing gear equipment

This equipment, as illustrated in Figures 3 to 6, consists of a set of bumpers forming a frame work and located under the fuselage 25 of the airplane 24. One of the bumper frame bars, designated 26 is located directly behind the landing wheels 27 of the airplane and shall be called the reverse bumper.

The bumper frame bars in front of the landing wheels are designated 28 and 29 respectively, the bar 29 is nearest to the landing wheels 27, and the bar 28 is farther away, and is principally intended for use with large planes.

Bumper frame bars 26 and 29 are braced against one another by means of the longitudinally extending bars 30, 31, 32 and 33, and by inclined braces 34, 35, against the fuselage, while bumper 28 is braced by means of bars 36, 37, against the inclined fuselage braces 34, 35 and against the fuselage proper by the braces 38, 39.

The bumpers and their bracing members are preferably made of light tubular metallic material and the length of the bumpers 26 and 29 is determined by the distance between the center lines of the landing wheels plus about eight inches on each end. The length of the bumper 28 is determined by the position of the braces supporting it. The center lines of the bumpers 26, 29 are about 1'—6" above the platform level or ground level of the landing stage, and are to be about 8'—9" apart.

The center line of bumper bar 28 is to be about 2'—6" above the platform level, and about 6'—0" in front of bumper 29.

All front bumper connections are constructed with spring shock absorbers 40, as for instance illustrated in Figure 6.

B. The landing stage equipment

This equipment, as illustrated in Figures 8 to 22 comprises a plurality of hooks 41, 42, 43 adapted to project through the slot in platform 14 and supported and pivoted intermediate their ends as at 43' (Fig. 11) on carriages 44 which are built of light structural frame members.

These carriages are equipped with ball bearing rollers 45 traveling on tracks 46 on a level directly below the slotted landing platform level 14 which shall be referred to hereinafter as the landing equipment level.

The hook 41 at the rear end of the carriage furthest away from the center of the building is called the reverse hook and pivots with the open side of the hook directed towards the center of the building and contacts with the reverse bumper 26 of the plane equipment.

The other two hooks, 42, 43 contact with the front bumpers 29, 28 of the plane and are called the front hooks, the one located at the forward end of the carriage or nearest the center of the building being hook 43. Hooks 42 and 43 pivot with their open side of the hook portion directed away from the center of the building. Hook 43 is connected to the front end of the carriage by means of a spring 47 (Fig. 8) which holds the same and also hook 42 connected to the same by means of a rod 48 in an upright position extending through slot 49 of the landing platform 14.

Hook 43 is also connected by a rod 50 to a slide block 51 in a buffer housing 52 at the forward end of the carriage so that when the carriage moves forward to the front buffer, the same will be pushed into its housing to move backward and the hooks 42 and 43 will pivot below the landing platform level.

Hook 41 (Fig. 11) is connected by means of a rod 53, spring 54 and turnbuckle arrangement 55 to a hook 56 to the rear end of the carriage and also by a rod 57 to a slide block 58 in a housing 59 located at the rear end of the carriage and is operated by the reverse buffer 60.

When the carriage is in a position at the end of the track lane furthest away from the center of the building with the reverse buffer inserted in its housing on the carriage, reverse hook 41 will assume the position illustrated in Figure 11, below the level of the landing platform.

The carriage is held by means of a spring catch on the buffer 60 shown in Figure 12 counteracting the tendency of the carriage to push away from buffer, caused by the tendency of the spring 54 to contract. Block 58 is forced forward by the inserted buffer to pivot hook 41 by reason of its connections 57 and 58.

On account of the expanded spring 54 when buffer is inserted, spring catch 62 in the buffer expands and locks with buffer housing counteracting the tendency of expanded spring 54 to cause the carriage to push away from the buffer.

A similar spring catch arrangement is also provided for the front buffers connected to hooks 42, 43.

The carriage is motor driven and its motor 64 is located below and between hooks 41 and 42 and its power is transmitted by means of the gears 65, 66 (Figs. 20, 21) to the driving axle 67 and wheels 68, which are so constructed that they may be raised from and held in a position above the tracks 69 on which the wheels 70 run. For this purpose the axle 67 is displaceable in an arcuate track 71 of a casting 72 and is controlled by a spring 73 secured at one end to an eye of a bearing block 74 for the drive axle 67 and at its other end to an eye 75 on the carriage frame. In this manner by raising the wheels above the track any friction which may be caused by the motor will be eliminated when the motor is not in use by means of a drive wheel disconnecting block 76

(Fig. 11) which is located between and at the rear end of the tracks in a position so that when the carriage runs towards the reverse buffer, it passes over block 76 and the drive wheel axle when coming in contact with the block pivots in its bearings and is held in a position with the wheels off the tracks so that when the carriage is in normal position, the drive wheels are in a neutral position.

The drive wheels are released from this neutral position when a power switch in the control room is operated to start the motor by means of a current transmitted through a third rail 77 to the motor and releasing the catch block 78 holding drive axle and wheels in their neutral position causing them to pivot down and contact with the tracks because of the spring lock 73.

A hydraulically operated brake system (Figs. 13, 14, 15) is provided to brake the carriage with airplane thereon when it arrives at the inner end of the landing platform, and this system comprises the continuous steel bands 80, 81 located at the sides of each carriage lane. These bands when expanded or forced towards the center of the track, contact with and exert a pressure against the ball bearing roller brake contacts 82, 83 located on the carriage casing causing the rapidly moving carriage to slow down and finally come to a stop.

The braking action produces a smooth deceleration and prevents heating and wearing off of the parts as the contacts have the form of ball bearing rollers.

The brake bands are expanded by means of a fluid fed from a suitable source of supply through a pipe line 84, 85. This pipe line has T-fittings 86 approximately every 12" spaced from one another, so that when the liquid is compressed, the plungers 87 will be forced outward against the brake bands forcing the same to move towards the carriage and exerting a pressure against the roller brake contacts 82, 83.

The compression of the liquid or fluid such as for instance oil is effected by means of compressed air supplied through a pipe line 88 (Fig. 16) forcing the pistons 87 in and brake bands 81 against the rollers.

The pistons and liquid chambers are located at the head end of the brake bands or that end located furthest away from the center of the building to move forward and compress the liquid.

The compressed air supply is controlled by means of a quick opening gate valve 89 coupled to the air relief valve 90 (Fig. 16) located directly before the piston chamber 86. The quick opening gate valve 89 is operated by means of a member 91 on the passing carriage which throws the lever 89 opening the gate valve and simultaneously closes the air relief valve 90. The air rushing into and building up a pressure in the piston chambers moves the pistons forward and compresses the liquid expanding the brake bands 80, 81. The brakes are released by means of an electrical circuit switch in the control room by the energization of a solenoid 92 which closes the gate valve again and opens the air relief valve allowing the built up air pressure in the piston chambers to escape and thus relieving the pressure on the brake bands.

C. The take-off equipment

This equipment, as illustrated in Figures 17, 18, 19, 23, 24 and 25 consists of a series of motor driven chain conveyers, 93, 94, 95 located directly below and supported by the inclined take-off platform 96 which is slotted as at 97 in a manner similar to the landing platform. Through each of these slots, which extend the full length of the take-off platform, will extend, perpendicular to the platform, a series of upright bars or levers 98 which will contact with bumpers 41 and 42 of the plane equipment and which shall hereinafter be called the catapults. These catapults are secured to the chain conveyors and braced against the same as at 99. The catapult chain 93 is nearest the center of the building, 95 is the outermost at the extreme outer end of the building and 94 is the chain between chains 93 and 95.

The chains are interconnected by two chains 100, 101, chain 100 connecting catapult chains 93 and 94 and chain 101 connecting chains 94 and 95, for the purpose of synchronizing the speeds of the catapult chains.

The catapult chains are guided over intermediate sprockets 102 on shafts 103 the ends of which are journaled in suitable bearings 104 below the take-off platform 96. Larger sprockets 105 are arranged at certain intervals in front and in rear of the intermediate sprockets.

Chains 93, 94 and 95 have at certain intervals connected thereto the lower ends or foot parts 106 of the levers 98 which are slotted intermediate their ends, as at 107, and in these slots are displaceably arranged pins 108 at the upper ends of the braces 99, the lower ends of which are connected to small foot parts 109 on the chains 93, 94, 95.

The sprockets 105 are head and tail sprockets, the head end of the chain being that furthest away from the center of the building and which we call the motor end.

The catapult chains are driven by six pairs of motors 110, 111 and 112 two to each set of chains, and their power is transmitted to the catapult chains by chains 113 guided over drive sprockets 114 on the motor shafts and 115 on the shafts 116 of the chain sprocket 105. When the catapult chains rotate upon their sprockets that portion of the chain in the upper position is called the top chord and the catapults fastened to it are in a position extending through the slots in the take-off platform. The portion of the chain in low position is called the bottom chord and is below the platform. The top chord of the catapult chain is supported at certain intervals by the intermediate spring 102, so that the top chord will rotate in a line parallel to the finished platform level eliminating the natural sag of the top chord.

The interconnecting chains 100, and 102 are guided over sprockets 117 on shafts 116. The direction of motion of the catapult chain for the top chord is away from the center of the building.

The catapults are braced in such manner that the braces 99 shall slide in the slots 107 of the catapult levers 98, so that when making a turn around the sprockets the chains will not buckle. The braces furthermore serve the purpose to prevent forcing of the catapult levers backwards under the weight of the plane equipment and to prevent the latter from slipping over the catapult levers.

The braces are located at the fore side of the catapults on that side furthest away from the center of the building on all catapult chains excepting chain 93 where one of the catapult levers has its brace on the side nearest to the center of the building for the purpose of holding back the plane while the propellers are for instance warming up, and this catapult lever 118 (Fig. 23) is called the reverse catapult lever, and is shown in its normal position before the catapult action sets in.

On the face of the enclosed portion of the landing and take-off platform, on the landing platform side and directly above the opening in said enclosed portion we arrange a system of lights (green and red) respectively when all carriages are in their normal position green lights will show, signalling to the pilot of an airplane that a landing may be made.

When one or more of the carriages move from their normal position the green light will be changed to red on the respective track. On the enclosed portion and at the exterior of the wall at the take-off platform red lights are located so that a pilot may not attempt to make a landing on this side of the station.

The operator in his room has in front of himself a panel board displaying one light for each of the carriages, when the carriages are in their normal positions these lights will be out, but as soon as one or the other of the carriages has left its normal position the lights will be lit.

Below each of these lights are located the switch controls for the operation of each individual carriage, and a switch for the purpose of closing the quick opening gate valve and simultaneously opening the air relief valve of the brake system for releasing the pressure of the brakes upon the carriage roller brake contacts.

Below the lights indicating the carriage position is also arranged a switch for the purpose of operating the drive motor on each carriage, so that the carriage may be brought to the front buffer or sent back to its normal position. For the purpose of operating all motors on all carriages simultaneously we arrange a major switch which is thrown after each individual carriage switch has been set.

A rheostat controlling motor for the take-off equipment is also located in the control room.

Practical use of my device will become apparent from the following:

A pilot of an airplane about to land on the platform, seeing a green light displayed, makes a landing on the front part 18 of the landing platform, runs his ship forward to the slotted area where his plane is engaged by the hooks holding plane on the carriage. Then carriage and plane move inwardly under their own momentum until the brake system is operated by the carriage passing the gate valve to gradually decelerate and finally stop the carriage. (The size of the airplane will determine the number of carriages to be used for the landing thereof.)

The operator advised by a light on his panel board indicating which carriages are in use, then operates the switches to release the brake system and to operate the switch to close a circuit over the third rail to operate the motors of the carriages until the forward moving carriages engage the front buffer for disengaging the front hooks from the airplane.

The attendants will then roll the plane off the slotted platform and the control switch will now be operated to bring the carriage back to normal position under its own motor power.

It will be clear that I have described and shown the preferred form of my system only as an example of the many possible ways to practically construct the same and that I may make such changes therein as come within the scope of the appended claims without departure from the spirit of my invention and the principles involved.

Having thus described my invention, what I claim as new and desire to secure by Letters Patent is:

1. In an airplane landing and starting station or terminal, carriages for receiving and carrying a landed airplane having rear and front bumper bars, and comprising a frame work on wheels, a front hook adapted to engage the rear bumper bar on an airplane, and rear hooks to engage the front bumper bars on the airplane landing on the carriage, spring connections between the lower ends of the rear hooks, all of said hooks pivotally attached intermediate their ends to the frames of said carriages, and buffers including a spring catch to counteract the tendency of the carriage to rebound at the end of its travel.

2. In an airplane landing and starting station, carriages for receiving and transporting the landed airplane, means to hold the airplane on said carriages, a motor on each carriage, a third rail by means of which power is transmitted to the motor, an axle on said carriage to be driven from the motor to drive the carriage, and a means to movably guide said axle, and means to release the same to avoid friction when the motor is not used.

3. In an airplane landing and starting station, carriages receiving and holding a landed airplane, adapted to be moved by the momentum of the landing plane, and means to decelerate and finally stop the movement of the carriages, said means comprising a pair of roller brake contacts, continuous steel brake bands contacting with said roller brake contacts, fluid controller means to expand said brake bands to engage said rollers, and compressed air operated means to compress the fluid for operating the brake bands.

4. In an airplane landing and starting station, carriages for receiving and holding a landed airplane, roller brake contacts on each carriage, steel bands substantially U-shaped in cross-section, means to hold the sections together for relative movement, a pipe line for a fluid including T-fittings, plungers in said fittings adapted to engage said brake bands with said brake rollers to decelerate and stop the motion of the carriages, and a pipe line supplying compressed air to compress the fluid in its pipe line, and a gate valve controlling the supply of fluid and air.

5. In an airplane landing and starting station, a quick action gate valve and an air relief valve, means coupling both valves, and means to operate said valve by a passing carriage to open the gate valve and closing the air relief valve.

6. In an airplane landing and starting station, a plurality of series of interconnected catapult chains, catapult levers, and braces for the same located at the fore side of the catapult chains on the outer ends thereof, one of said catapult levers having its brace on the inner end of its chain for the purpose of holding the plane back while the propellers are warming up.

7. In an airplane landing and starting station, carriages for receiving and holding a landing plane, motors on said carriages, wheels for said carriages and an axle for said wheels driven from the motor, a bearing block for said axle, an arcuate track in which said block is displaceably guided, and a spring connected to an eye of said block and to said carriage frame, and a means for raising and lowering the carriage wheels.

JOSEPH OLASZY.